US012587623B2

(12) United States Patent
Varekamp et al.

(10) Patent No.: US 12,587,623 B2
(45) Date of Patent: Mar. 24, 2026

(54) IMAGE SYNTHESIS

(71) Applicant: KONINKLIJKE PHILIPS N.V., Eindhoven (NL)

(72) Inventors: Christiaan Varekamp, Veldhoven (NL); Bart Kroon, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 15 days.

(21) Appl. No.: 18/844,210

(22) PCT Filed: Mar. 7, 2023

(86) PCT No.: PCT/EP2023/055647
§ 371 (c)(1),
(2) Date: Sep. 5, 2024

(87) PCT Pub. No.: WO2023/174743
PCT Pub. Date: Sep. 21, 2023

(65) Prior Publication Data
US 2025/0193357 A1      Jun. 12, 2025

(30) Foreign Application Priority Data

Mar. 16, 2022      (EP) ..................................... 21162512

(51) Int. Cl.
*H04N 13/111* (2018.01)
*H04N 13/172* (2018.01)

(52) U.S. Cl.
CPC ......... *H04N 13/111* (2018.05); *H04N 13/172* (2018.05)

(58) Field of Classification Search
CPC .. H04N 13/111; H04N 13/172; H04N 19/597; H04N 21/21805; H04N 21/44012;
(Continued)

(56) References Cited

U.S. PATENT DOCUMENTS

| 10,950,037 B2 * | 3/2021 | Sunkavalli | ................ G06T 3/18 |
| 11,681,910 B2 * | 6/2023 | Horikawa | .............. G06N 3/045 |
| | | | 382/154 |

(Continued)

FOREIGN PATENT DOCUMENTS

| EP | 3629585 A1 * | 4/2020 | ........... H04N 21/816 |
| EP | 3840389 A1 | 6/2021 | |

(Continued)

OTHER PUBLICATIONS

International Search Report and Written Opinion from PCT/EP2023/ 055647 mailed Oct. 5, 2023.

(Continued)

*Primary Examiner* — Thai Q Tran
*Assistant Examiner* — Stephen R Smith

(57) ABSTRACT

A first apparatus comprises a first receiver (301) receiving images of a scene captured and a second receiver (303) receives 3D spatial data for the scene A view synthesis neural network (307) generates view shifted images for the scene for different view poses from the images and the spatial data. A neural network trainer (309) trains the view synthesis neural network (307) based on images of the scene for different view poses. A generator (305) generates an audiovisual data stream comprising: image data for the images, scene data representing the three dimensional spatial data, and coefficient data describing coefficients of the view synthesis neural network (307) after training. A second apparatus receives the audio visual data stream and sets a local neural network (403) based on the coefficient data. The local neural network (403) is then used to generate images of the scene for different view poses.

24 Claims, 9 Drawing Sheets

(58) Field of Classification Search
CPC .. H04N 21/816; H04N 13/156; H04N 13/161;
H04N 13/194; G06N 3/02; G06N 3/045;
G06T 15/20; G06T 17/00; G06T 19/00
USPC ............................................. 348/43; 382/154
See application file for complete search history.

(56) References Cited

U.S. PATENT DOCUMENTS

| | | | |
|---|---|---|---|
| 12,278,937 B2 | 4/2025 | Jung et al. | |
| 2020/0045289 A1* | 2/2020 | Raziel ................. | H04N 13/161 |
| 2020/0120324 A1 | 4/2020 | Kwong et al. | |
| 2020/0137375 A1 | 4/2020 | Kroon et al. | |
| 2021/0125583 A1 | 4/2021 | Kaplanyan et al. | |
| 2021/0329306 A1* | 10/2021 | Liu .......................... | G06N 5/04 |
| 2021/0400314 A1 | 12/2021 | Varekamp | |
| 2022/0036602 A1* | 2/2022 | Duckworth ............... | G06T 7/90 |
| 2022/0067982 A1* | 3/2022 | Pardeshi ................ | G06N 3/094 |
| 2022/0277510 A1* | 9/2022 | Funt ..................... | G06N 3/0499 |
| 2022/0398705 A1* | 12/2022 | Martin Brualla ....... | G06T 15/20 |

FOREIGN PATENT DOCUMENTS

| | | | |
|---|---|---|---|
| WO | 2020165493 A1 | 8/2020 | |
| WO | 2021123072 A1 | 6/2021 | |

OTHER PUBLICATIONS

Danilo Jimenez Rezende et al: "Unsupervised Learning of 3D Structure from Images", arxiv.org, Cornell University Library, 201 Olin Library Cornell University Ithaca, NY 14853.
Rochette Guillaume et al: "Human Pose Manipulation and Novel View Synthesis using Differentiable Rendering", 2021 16th IEEE International Conference on Automatic Face and Gesture Recognition (FG 2021), IEEE, Dec. 15, 2021 (Dec. 15, 2021), pp. 1-8.
Wang et al "IBRNET: Learning Multi-View Image Based Rendering" Computer Vision and Pattern Recognition, Feb. 25, 2021.
Tewari et al Advances in Neural Rendering: Computer Research Repository, vol. 41 (2):703-735.
Kingma et al : "A Method for Stochastic Optimization". 3rd International Conference for Learning Representations, San Diego, 2015.
Xavier Glorot, Antoine Bordes, Yoshua Bengio "Deep Sparse Rectifier Neural Networks" Proceedings of the Fourteenth International Conference on Artificial Intelligence and Statistics, PMLR 15:315-323, 2011).
Hochreiter, Sepp, and Jurgen Schmidhuber. "Long short-term memory." Neural computation 9.8 (1997): 1735-1780.

* cited by examiner

701

705

707

$$l = \max\left(0, \sum_{n} w_n x_n\right)$$

IMAGE SYNTHESIS

CROSS-REFERENCE TO PRIOR APPLICATIONS

This application is the U.S. National Phase application under 35 U.S.C. § 371 of International Application No. PCT/EP2023/055647, filed on Mar. 7, 2023, which claims the benefit of EP Patent Application No. EP 22162512.2, filed on Mar. 16, 2022. These applications are hereby incorporated by reference herein.

FIELD OF THE INVENTION

The invention relates to image synthesis based on neural networks and in particular, but not exclusively, to video frame synthesis based on neural networks.

BACKGROUND OF THE INVENTION

The variety and range of image and video applications have increased substantially in recent years with new services and ways of utilizing and consuming video being continuously developed and introduced.

For example, one service being increasingly popular is the provision of image sequences in such a way that the viewer is able to actively and dynamically interact with the system to change parameters of the rendering. A very appealing feature in many applications is the ability to change the effective viewing position and viewing direction of the viewer, such as for example allowing the viewer to move and look around in the scene being presented.

Such a feature can specifically allow a virtual reality experience to be provided to a user. This may allow the user to e.g. (relatively) freely move about in a virtual environment and dynamically change his position and where he is looking. Typically, such eXtended Reality (XR) applications are based on a three-dimensional model of the scene with the model being dynamically evaluated to provide the specific requested view. This approach is well known from e.g. game applications, such as in the category of first person shooters, for computers and consoles. eXtended Reality (XR) applications include Virtual Reality (VR), Augmented Reality (AR), and Mixed Reality (MR) applications.

An example of a video service or application that has been proposed is immersive video where video is played-back on e.g. a VR headset to provide a three-dimensional experience. For immersive video, the viewer has freedom to look and move around in the presented scene such that this may be perceived as being viewed from different viewpoints. However, in many typical approaches, the amount of movement is limited, e.g. to a relatively small area around a nominal viewpoint which may typically correspond to a viewpoint from which the video capture of the scene has been performed. In such applications, three dimensional scene information is often provided that allows high quality view image synthesis for viewpoints that are relatively close to the reference viewpoint(s) but which deteriorates if the viewpoint deviates too much from the reference viewpoints.

Immersive video may also often be referred to as 6-degrees-of-freedom (6DoF) or 3DoF+video. MPEG Immersive Video (MIV) is an emerging standard where meta-data is used on top of existing video codecs to enable and standardize immersive video.

An issue with immersive video is that the viewing-space, being 3d-space wherein a viewer has a 6DoF experience of sufficient quality, is limited. As the viewer moves outside the viewing space, degradations and errors resulting from synthesizing the view images become increasingly significant and an unacceptable user experience may result. Errors, artefacts, and inaccuracies in the generated view images may specifically occur due to the provided 3D video data not providing sufficient information for the view synthesis (e.g. de-occlusion data).

For example, immersive video data may be provided in the form of a multi-view possibly accompanied with depth data (MVD) representation of the scene. The scene may be captured by a number of spatially differentiated cameras and the captured images may be provided together with depth maps. However, the likelihood that such a representation does not include sufficient image data for areas that are de-occluded increases substantially as the viewpoints increasingly differ from the reference viewpoints from which the MVD data was captured. Thus, as a viewer moves away from the nominal position, image parts that should be de-occluded for the new viewpoint but are missing from the source views cannot be synthesized directly from image data describing such image parts. Also, imperfect depth maps may result in distortions when performing view synthesis and specifically as part of the view warping that is an integral part of the synthesis operation. The further the viewpoints that are synthesized are from the original camera viewpoint, the more severe are the distortions in the synthesized view.

Most existing methods for view synthesis from multi view images require the availability of a depth map per source view and synthesize a new view by combining the predictions from multiple reference views. The prediction from a reference view is then performed using depth steered rendering.

A recent alternative approach is to convert the multi view images to a layered representation (such as e.g., Multi Plane Image (MPI), Multi Sphere Image (MSI), of Multi Object Surface Image (MOSI) formats) containing transparency and to encode/compress this layered representation. After decoding a new view can be synthesized via back-to-front layer compositing.

Regardless of the specific 3D image format used, the process of generating view images for different view poses is a challenging process that tends to result in imperfect images. Most image synthesis algorithms tend to introduce some artefacts or errors e.g., due to imperfect de-occlusion etc. Further, most approaches tend to require complex and computationally intensive processing to generate images for different view poses with a desired quality. Also, the requirements for the 3D image data that needs to be generated in order to allow a view synthesis algorithm to generate reliable and high-quality images are challenging to meet and tend to increase data rates and make distribution and communication of such data difficult and resource demanding.

Hence, an improved approach would be advantageous. In particular, an approach that allows improved operation, increased flexibility, an improved immersive user experience, reduced complexity, facilitated implementation, increased synthesized image quality, improved rendering, increased (possibly virtual) movement freedom for a user, improved and/or facilitated view synthesis for different view poses, reduced data requirements, and/or improved performance and/or operation would be advantageous.

SUMMARY OF THE INVENTION

Accordingly, the Invention seeks to preferably mitigate, alleviate or eliminate one or more of the above-mentioned disadvantages singly or in any combination.

According to an aspect of the invention there is provided an apparatus comprising: a first receiver arranged to receive a plurality of images of a three dimensional scene captured from different view poses; a second receiver arranged to receive three dimensional spatial data for the scene; a view synthesis neural network arranged to generate view shifted images for the scene for different view poses from the plurality of images and the three dimensional spatial data; a neural network trainer arranged to train the view synthesis neural network based on images of the scene for different view poses; a generator arranged to generate an audiovisual data stream comprising: image data for at least some of the plurality of images; scene data representing the three dimensional spatial data; coefficient data describing coefficients of the view synthesis neural network after training.

The invention may allow improved data characterizing a scene being generated and may allow improved images synthesis. The approach may allow improved image synthesis for different view poses. In many embodiments, data allowing efficient and high quality view shifting and synthesis based on a neural network may be generated.

The invention may provide an improved user experience in many embodiments and scenarios. The approach may for example allow improved XR/AR/VR/MR applications based on a limited capture of the scene.

The use of a neural network for view synthesis may provide improved view synthesis in many embodiments and may e.g. allow increased flexibility and reduced requirements for the data representing the scene.

The plurality of images may comprise a set of multi-view images. The images of the plurality of images may be two-dimensional images. The scene may be a real life scene and the plurality of images may be captured images of the real life scene. The images may be images captured by image or video cameras. The three-dimensional spatial data may represent spatial properties of the scene, and may e.g. include or consist of 3D point clouds, meshes for a (static) background or (dynamic) foreground objects, or depth maps. The three-dimensional spatial data may be independent of/unrelated to any view poses for the plurality of images, or to the plurality of images. The three-dimensional spatial data may be view-pose independent. The three-dimensional spatial data may be view pose independent data describing geometric/spatial properties of the scene. The three-dimensional spatial data may not be tied to a view, or represented in, or associated with the plurality of images and/or view poses of the plurality of images. The three-dimensional spatial data may comprise or consist of geometric primitives such as 3D points, planes, surfaces, lines, meshes, etc.

The server neural network may specifically be a convolutional network. The server neural network may include one or more convolutional layers. The coefficients may include coefficients of filters/kernels for one or more convolutional layers. One, more, or all of the convolutional layers of the server neural network may be hidden or processing layers.

In some embodiments the server neural network may comprise one or more fully connected layers. The coefficients may include weights for connections of one or more fully connected layers.

A pose may be/represent/indicate a position, an orientation, or a position and orientation.

The images of the scene for different view poses used to train the view synthesis neural network may include one or more of the plurality of images received by the first receiver.

View shifted images may be images synthesized for view poses that are different from the view poses of the plurality of images.

According to an optional feature of the invention, the first receiver is arranged to receive a set of input video sequences representing views of the three dimensional scene from the different view poses and the plurality of images are frames of the set of input video sequences; and wherein: the neural network trainer is arranged to dynamically train the view synthesis neural network to result in coefficients of the view synthesis neural network changing with time; and the generator is arranged to generate the audiovisual data stream to comprise frames from the set of input video sequences and time varying coefficient data describing time varying coefficients of the view synthesis neural network after training.

The invention may allow improved data dynamically characterizing a scene being generated and may allow improved video synthesis.

According to an optional feature of the invention, the neural network trainer is arranged to train the view synthesis neural network using a training set of images comprising a first set of reference images for view poses not represented by images of the at least some of the plurality of images.

This may provide improved training and thus image synthesis in many scenarios. It may enhance training to reflect properties over a larger area, such as specifically over an entire desired viewing region.

According to an optional feature of the invention, there is provided the first set of reference images includes at least one image selected from the group of: a reference image generated by a non-neural network view shifting using the plurality of images; a reference image generated from a visual scene model of the scene.

This may provide improved training and image synthesis over a larger area and may compensate/mitigate for limited capture data being available. The approach may reduce the capture requirements.

According to an optional feature of the invention, the training set of images comprises a second set of reference images comprising images of the plurality of images, and the neural network trainer is arranged to apply different weightings to the first set of reference images and the second set of reference images.

This may provide improved operation and training in many scenarios. The different weightings may for example be implemented by applying different weights for contributions to a cost function used for training the server neural network.

According to an optional feature of the invention, the neural network trainer is arranged to encode and decode at least some of the plurality of images prior to being provided to the view synthesis neural network.

This may improve performance in many embodiments and may e.g. result in the neural network view synthesis also compensating/mitigating for impact and degradation resulting from the communication/distribution of the audio-visual data stream.

According to an optional feature of the invention, the neural network trainer is arranged to encode and decode the three dimensional spatial data prior to being provided to the view synthesis neural network.

This may improve performance in many embodiments and may e.g., result in the neural network view synthesis also compensating/mitigating for impact and degradation resulting from the communication/distribution of the audiovisual data stream.

According to an optional feature of the invention, the neural network trainer is arranged to initialize the view synthesis neural network with a set of default coefficients and to train the view synthesis neural network to determine modified coefficients for the view synthesis neural network; and wherein the generator is arranged to include at least some modified coefficients in the audio visual data stream.

This may allow improved operation in many embodiments and scenarios and may in particular allow reduced data rate and/or faster initialization in many embodiments.

In some embodiments, the neural network trainer may be arranged to select the set of default coefficients from a plurality of sets of default coefficients in response to the plurality of images.

According to an optional feature of the invention, the generator is arranged to select a subset of coefficients for transmission in response to a difference between the modified coefficients and the default coefficients.

This may allow improved operation in many embodiments and scenarios.

In some embodiments, the generator is arranged to include image data for only a subset of the plurality of images and to further include at least one feature map of the view synthesis neural network for an image for a view pose different from view poses of the subset of the plurality of images.

In some embodiments, the generator is arranged to include at least one feature map of the view synthesis neural network for an image of a view pose that is different from the view poses of the plurality of images.

In some embodiments, the generator is arranged to generate the audiovisual data stream such that at least two of the image data, the scene data, and the coefficient data share a Group Of Pictures, GOP, structure.

In some embodiments, the first receiver is arranged to receive an input video sequence comprising a plurality of frames representing views of the three dimensional scene from the different view poses for each of a plurality of time instants, and the plurality of images comprises a set of frames for one time instant; and wherein the neural network trainer is arranged to dynamically train the view synthesis neural network to result in coefficients of the view synthesis neural network changing with time; and the generator is arranged to generate an output video sequence comprising image data for at least some frames of the input video sequence and coefficient data for different time instants of the output video sequence.

According to an aspect of the invention there is provided an apparatus comprising: a receiver arranged to receive audiovisual data stream comprising: image data for a plurality of images representing a three dimensional scene captured from different view poses, three dimensional spatial data for the scene, and coefficient data describing coefficients for a view synthesis neural network; the view synthesis neural network arranged to generate view shifted images for the scene for different view poses from the plurality of images and the three dimensional spatial data; and a neural network controller for setting coefficients of the neural network in response to the coefficient data.

The invention may allow improved images synthesis. The approach may allow improved image synthesis for different view poses.

The invention may provide an improved user experience in many embodiments and scenarios. The approach may for example allow improved XR/AR/VR/MR applications based on a limited capture of the scene.

The plurality of images may comprise a set of multi-view images. The images of the plurality of images may be two-dimensional images. The scene may be a real life scene and the plurality of images may be captured images of the real life scene. The images may be images captured by image or video cameras. The three-dimensional spatial data may represent spatial properties of the scene, and may e.g. include or consist in 3D points clouds, meshes for a (static) background or (dynamic) foreground objects or depth maps.

The client neural network may specifically be a convolutional network. The client neural network may include one or more convolutional layers. The coefficients may include coefficients of filters/kernels for one or more convolutional layers. One, more, or all of the convolutional layers of the client neural network may be hidden or processing layers.

In some embodiments the client neural network may comprise one or more fully connected layers. The coefficients may include weights for connections of one or more fully connected layers.

View shifted images may be images synthesized for view poses that are different from the view poses of the plurality of images.

According to an optional feature of the invention, the audiovisual data stream comprises a set of video sequences comprising plurality of frames representing views of the three dimensional scene from the different view poses, and the plurality of images are frames of the plurality of frames; and the coefficient data includes time varying coefficient data describing time varying coefficients of the view synthesis neural network; and the neural network controller is arranged to change the coefficients of the view synthesis neural network in response to the time varying coefficient data.

This may allow improved image synthesis in many embodiments.

According to an optional feature of the invention, the neural network controller is arranged to determine interpolated coefficient values for at least one time instant for which coefficient data is not included in the audiovisual data stream, the interpolated coefficient values being determined from coefficient values of the time varying coefficient data; and to set the coefficients of the view synthesis neural network to the interpolated coefficient values for the at least one time instant.

This may allow improved image synthesis in many embodiments.

According to an optional feature of the invention, the audiovisual data stream includes at least one neural network feature map for an image of a view pose that is different from the view poses of the plurality of images, and the neural network controller is arranged to configure the view synthesis neural network with the at least one feature map.

This may allow improved image synthesis in many embodiments. In many scenarios it may allow a reduced data rate of the audio visual data stream.

This may allow improved image synthesis in many embodiments.

According to an optional feature of the invention, the neural network controller is arranged to initialize the view synthesis neural network with a set of default coefficients and to overwrite the default coefficients by coefficients from the audio visual data stream.

This may allow improved image synthesis in many embodiments.

According to an optional feature of the invention, the neural network controller is arranged to select the set of default coefficients from a plurality of sets of default coefficients in response to the plurality of images.

This may allow improved image synthesis in many embodiments.

In some embodiments, the neural network controller is arranged to initialize the neural network with default coefficients and to override default coefficients by coefficients determined from the coefficient data.

According to an optional feature of the invention, the at least two of the image data, the scene data, and the coefficient data share a Group Of Pictures, GOP, structure in the audiovisual data stream.

This may allow improved operation in many scenarios. It may facilitate encoding and/or decoding of the audio visual data stream.

According to an optional feature of the invention, the view synthesis neural network comprises a number of tuneable layers and a number of non-tuneable layers, and the audiovisual data stream includes coefficient data only for tuneable layers.

This may allow improved image synthesis in many embodiments. In many scenarios it may allow a reduced data rate of the audio visual data stream.

In some embodiments, the view synthesis neural network comprises a number of fixed layers having fixed coefficients and a number of variable layers having variable coefficients; and the neural network trainer is arranged to train only the number of tuneable layers; and the generator is arranged to generate the audiovisual data stream to include coefficient data only for the variable coefficients.

According to an optional feature of the invention, the three dimensional spatial data comprises video point cloud data for the scene.

This may allow improved image synthesis in many embodiments.

According to an aspect of the invention there is provided an audiovisual data stream comprising: image data for a plurality of images representing a three dimensional scene captured from different view poses, three dimensional spatial data for the scene, and coefficient data describing coefficients for a view synthesis neural network for generating view shifted images for the scene for different view poses from the plurality of images and the three dimensional spatial data.

According to an aspect of the invention there is provided a method for generating audio visual data stream, the method comprising: receiving a plurality of images of a three dimensional scene captured from different view poses; receiving three dimensional spatial data for the scene; a view synthesis neural network generating view shifted images for the scene for different view poses from the plurality of images and the three dimensional spatial data; training the view synthesis neural network based on images of the scene for different view poses; and generating an audiovisual data stream comprising: image data for at least some of the plurality of images, scene data representing the three dimensional spatial data, and coefficient data describing coefficients of the view synthesis neural network after training.

According to an aspect of the invention there is provided a method comprising: receiving an audiovisual data stream comprising: image data for a plurality of images representing a three dimensional scene captured from different view poses, three dimensional spatial data for the scene, and coefficient data describing coefficients for a view synthesis neural network; a view synthesis neural network generating view shifted images for the scene for different view poses from the plurality of images and the three dimensional spatial data; and setting coefficients of the view synthesis neural network in response to the coefficient data.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF THE EMBODIMENTS

Three dimensional video capture, distribution, and presentation is becoming increasingly popular and desirable in some applications and services. A particular approach is known as immersive video and typically includes the provision of views of a real-world scene, and often a real time event, that allow small viewer movements, such as relatively small head movements and rotations. For example, real-time video broadcast of e.g., a sports event that allows local client-based generation of views following small head movements of a viewer may provide the impression of a user being seated in the stands watching the sports event. The user can e.g., look around and will have a natural experience similar to the experience of a spectator being present at that position in the stand. Recently, there has been an increasing prevalence of display devices with positional tracking and 3D interaction supporting applications based on 3D capturing of real-world scenes. Such display devices are highly suitable for immersive video applications providing an enhanced three dimensional user experience.

The following description will focus on an immersive video application, but it will be appreciated that the described principles and concepts may be used in many other applications and embodiments.

In many approaches, the immersive video may be provided locally to a viewer by e.g. a stand-alone device that does not use, or even have any access to, any remote video server. However, in other applications, an immersive application may be based on data received from a remote or central server. For example, video data may be provided to a video rendering device from a remote central server and may be locally processed to generate a desired immersive video experience.

Figure 1:
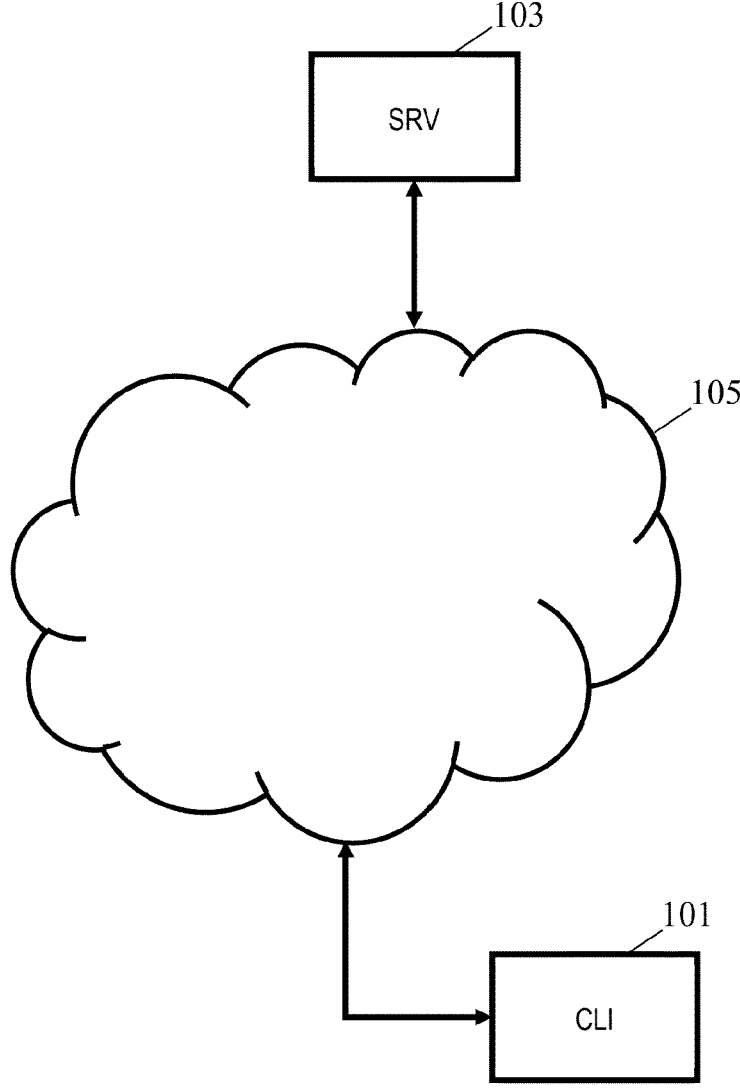
FIG. 1 illustrates an example of elements of an image distribution system.

FIG. 1 illustrates such an example of an immersive video system in which a video rendering client 101 liaises with a remote immersive video server 103 e.g. via a network 105, such as the Internet. The server 103 may be arranged to simultaneously support a potentially large number of client devices 101.

The server 103 may for example support an immersive video experience by transmitting three dimensional video data describing a real world scene. The data may specifically describe visual features and geometric properties of the scene which is generated from a real time capture of the real world by a set of (possibly 3D) cameras.

In order to provide such services for a real-world scene, the scene is typically captured from different positions and with different camera capture poses being used. As a result, the relevance and importance of multi-camera capturing and e.g. 6DoF (6 Degrees of Freedom) processing is quickly increasing. Applications include live concerts, live sports, and telepresence. The freedom of selecting one's own viewpoint enriches these applications by increasing the feeling of presence over regular video. Furthermore, immersive scenarios can be conceived where an observer may navigate and interact with a live captured scene. For broadcast applications this may require real-time view synthesis at the client device. View synthesis introduce errors and these errors depend on the implementation details of algorithms.

The server 103 of FIG. 1 is arranged to generate an audio visual data stream comprising data describing the scene and the client 101 is arranged to receive and process this audio visual data stream to generate an output video stream that dynamically reflects changes in the user pose thereby providing an immersive video experience where the presented view adapts to viewing/user pose/placement changes.

In the field, the terms placement and pose are used as a common term for position and/or direction/orientation. The combination of the position and direction/orientation of e.g., an object, a camera, a head, or a view may be referred to as a pose or placement. Thus, a placement or pose indication may comprise six values/components/degrees of freedom with each value/component typically describing an individual property of the position/location or the orientation/direction of the corresponding object. Of course, in many situations, a placement or pose may be considered or represented with fewer components, for example if one or more components is considered fixed or irrelevant (e.g. if all objects are considered to be at the same height and have a horizontal orientation, four components may provide a full representation of the pose of an object). In the following, the term pose is used to refer to a position and/or orientation which may be represented by one to six values (corresponding to the maximum possible degrees of freedom). The term pose may be replaced by the term placement. The term pose may be replaced by the term position and/or orientation. The term pose may be replaced by the term position and orientation (if the pose provides information of both position and orientation), by the term position (if the pose provides information of (possibly only) position, or by orientation (if the pose provides information of (possibly only) orientation.

An often used approach for representing a scene is known as a multi-view with depth (MVD) representation and capture. In such an approach, the scene is represented by a plurality of images with associated depth data where the images represent different view poses from typically a limited capture region. The images may in practice be captured by using a camera rig comprising plurality of cameras and depth sensors.

Figure 2:
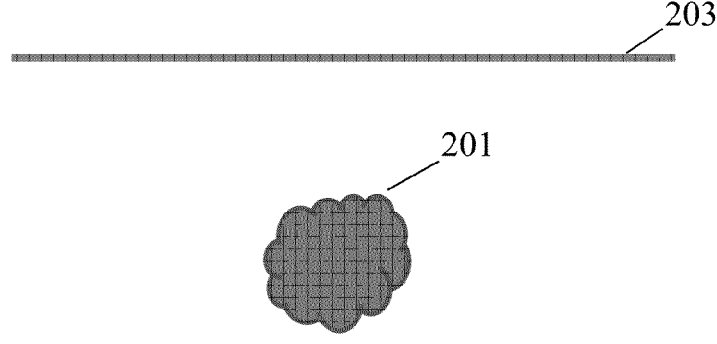
FIG. 2 illustrates an example of an image capture scenario.
Figure 2:
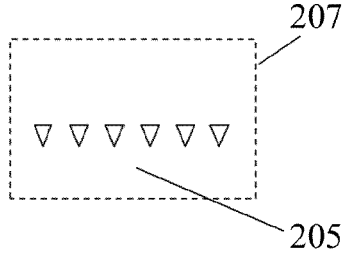

An example of such a capture system is shown in FIG. 2. The figure shows a scene to be captured comprising a scene object 201 in front of a background 203. A plurality of capture cameras 205 are positioned in a capture region 205. The result of the capturing may be a representation of the 3D scene by a multi-view image and depth representation, i.e. by image and depth being provided for a plurality of capture poses. The multi-view image and depth representation may thus provide a description of the 3D scene from a capture zone. Thus, the data representing the 3D scene may provide a representation of the 3D scene from a capture zone from which visual data provides a description of the 3D scene.

The MVD representation may be used to perform view synthesis whereby view images of the scene from a given view pose can be generated. The view pose may require view shifting of the images of the MVD representation to the view pose such that an image of the view(s) of the scene from the view pose can be generated and presented to the user. The view shift and synthesis are based on the depth data, with e.g. the parallax shift between positions in the MVD image(s) and the view pose image depending on the depth of the corresponding object in the scene.

The quality of the generated view images will depend on the images and depth information that is available to the view synthesis operation. It further depends on the amount of view shifting that is required.

For example, view shifting typically results in de-occlusion of parts of the image that may not be visible in e.g. a main image being used for the view shifting. Such holes may be filled in by data from other images if these have captured the de-occluded elements, but it is also typically possible that image parts that are de-occluded for the new viewpoint are also missing from the other source views. In that case, the view synthesis needs to estimate data based on e.g. surrounding data. The de-occlusion process inherently tends to be a process that introduces inaccuracies, artefacts, and errors. Further, this tends to increase with the amount of the view shift and specifically the likelihood of missing data (holes) during view-synthesis increases with increasing distance from the capture poses of the images.

Another source of possible distortions may be imperfect depth information. Often depth information is provided by depth maps where the depth values have been generated by depth estimation (e.g. by disparity estimation between the source images) or measurement (e.g. ranging) which is not perfect and therefore the depth values may include errors and inaccuracies. The view shifting is based on the depth information and imperfect depth information leads to errors or inaccuracies in the synthesized image(s). The further from the original camera viewpoint, the synthesized viewpoint is, the more severe are the distortions in the synthesized target view image.

Accordingly, as the view pose moves farther and farther away from the capture poses, the quality of the synthesized image will tend to degrade. If the view pose is sufficiently far away from the capture poses, the image quality reduces to an unacceptable degree and a poor user experience may be experienced.

Recently it has been proposed to perform view shifting and synthesis based on neural networks. In such applications, a neural network may be trained to synthesize view images for different view poses based on input images from a set of capture poses. The training may be based on a set of reference images that are provided for a range of view poses with the neural network being arranged to generate corresponding images for the same view poses. The differences between the reference images and the generated corresponding images may be used to adapt and train the neural network. The trained neural network may then be used to dynamically generate view images for different view poses e.g. to support a user virtually moving around in the scene. In the following, approaches for representing, processing, and rendering views of a scene based on the use of a neural network will be described.

Figure 3:
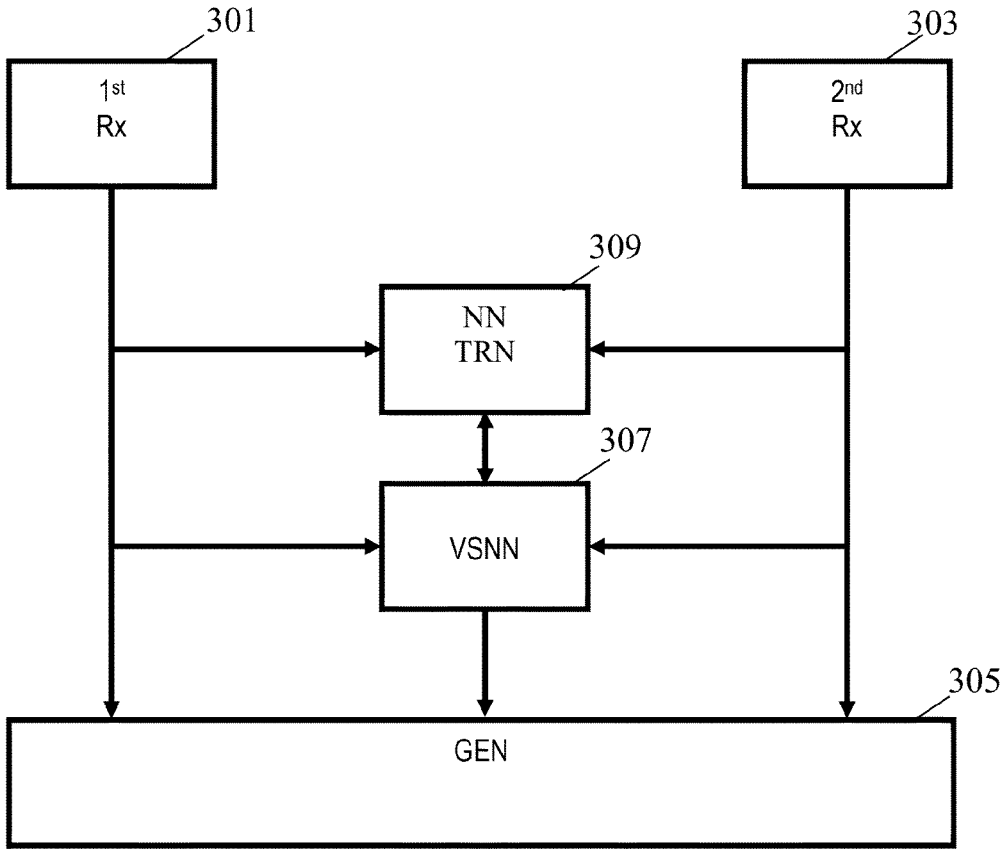
FIG. 3 illustrates an example of elements of an apparatus in accordance with some embodiments of the invention.

FIG. 3 illustrates elements of an exemplary apparatus for generating audiovisual data stream representing a scene. The audiovisual data stream comprises data representing the visual properties of the scene. The apparatus may specifically be a source or server providing the audio visual data stream to a remote device. Specifically, the apparatus may be an example of elements of the server 103 of FIG. 1 and the following description will focus on describing the apparatus with reference to the server 103.

Figure 4:
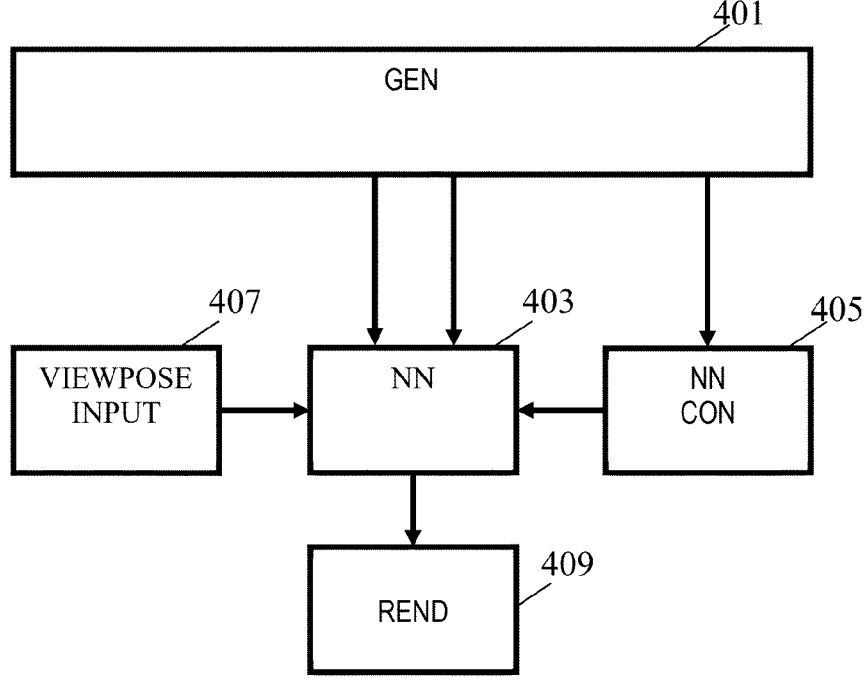
FIG. 4 illustrates an example of elements of an image synthesis apparatus in accordance with some embodiments of the invention.

FIG. 4 illustrates elements of an exemplary apparatus for generating images for a scene from an audiovisual data stream representing a scene, and specifically from an audio visual data stream as generated by the apparatus of FIG. 3. The apparatus may specifically be an end user device or client receiving the audio visual data stream from a remote device, such as from the apparatus of FIG. 3. Specifically, the apparatus may be an example of elements of the client 101 of FIG. 1 and the following description will focus on describing the apparatus with reference to the server 103.

The server 103 comprises a first receiver 301 which receives a plurality of images of a three dimensional scene where the images are view images for different view poses in the scene. The plurality of images may be images of the scene captured from different view poses. The images may in some embodiments be images of a real scene captured by cameras at different positions and/or with different orientations in the scene. In some embodiments, the images may alternatively or additionally be images of a virtual or partially virtually scene. The images may in such cases e.g. be generated/captured by evaluating a virtual model of the scene. The following will focus on captured images being images of a real scene captured by cameras with different poses in the scene. The plurality of images will be referred to as captured or input images.

The set of input images may be provided in any suitable format. In some embodiments, the images may further include depth and specifically a set of MVD images may be received.

In some embodiments, the input images may be static images of a static scene. However, in many embodiments, the images may be frames of one or more video sequences. For example, for each capture position, an input video sequence may be received. For example, a dynamic scene, such as e.g. a sports event or similar, may be captured from a set of video cameras positioned at given positions. Each of the cameras may provide a video sequence comprising frames. Thus, the first receiver 301 may receive a plurality of video sequences comprising time sequential frames with the frames of different video sequences representing different capture poses for the scene. It will be appreciated that in some embodiments, a single video sequence comprising frames for different capture poses for each time instant may be received.

The server 103 further comprises a second receiver 303 which is arranged to receive three dimensional spatial data for the scene. The spatial data may be indicative of spatial and geometric properties of objects in the scene. The spatial data may specifically be indicative of spatial properties, such as e.g. position, orientation, extension, of objects in the scene. Such objects may include background objects of the scene. For example, the spatial data may describe spatial extent of one or more objects in the scene.

The spatial data may be independent of the input images and may describe objects of the scene independently of the poses of the input images. The spatial data may be common for a plurality of the input images and/or for a plurality of frames for a video sequence. The spatial data may specifically be a model of the three-dimensional scene.

The spatial data may specifically be one or more of 3D points clouds, meshes for a (static) background or (dynamic) foreground objects, or depth maps. The spatial data may for example correspond to depth maps of an MVD representation.

The spatial data may specifically be spatial data provided by a laser system that measures an accurate point-cloud. Alternatively, the spatial data may be provided via human guided interaction with the source view images to for instance interactively create a mesh using a multi view mesh editor. Alternatively, a computer graphics mesh model (e.g. of a sports stadium) can be used and fitted (rotated and translated) to the source view data and used as a static background model. Alternatively, an object detector for a given object class (athlete) or category (floor, wall, sky) can be run and the resulting class labels or category labels can be used.

The spatial data may in some embodiments be 'man-made' for static objects using what we call a multi-view mesh editor in which case a human injects the information (The human can be viewed as the sensor). Another accurate source is in many cases a laser that generates a point cloud. Such a laser is typically much more accurate than a 'standard' depth sensor based on structured light or time-of-flight. As another example, an object detector that e.g. finds and fits the geometry of a basket in a basketball scene may be used. The spatial data may be data generated by a different sensor from that generating the input images. The spatial data may typically provide accurate geometry data of the scene. The spatial data may be geometric data for the scene.

The first receiver 301 and the second receiver 303 are coupled to a data stream generator 305 which is arranged to generate an audiovisual data stream representing the scene. The data stream generator 305 is arranged to include some, or possibly all, of the input images in the audio-visual data stream. The data stream generator 305 may in many embodiments be arranged to encode the images/frames/video in accordance with a suitable image or video encoding algorithm.

The data stream generator 305 is further arranged to generate and include scene data representing the 3D spatial data. In many embodiments, some or all of the 3D spatial data may be included in the audio-visual data stream. In some embodiments, the generation of the scene data may include an encoding or compression of the 3D spatial data.

As an example, an entity map comprising object category labels with multi-view patches similarly to known from the MPEG immersive Video Standard may be included.

The server 103 further includes a view synthesis neural network, henceforth referred to as the server neural network 307. The server neural network 307 is arranged to synthesize images for different view poses based on the spatial data and on some or all of the captured input images.

The server neural network 307 may be arranged to receive a set of images, which specifically may be frames of a video sequence, representing the scene from different view poses, and it may further receive the 3D spatial data. Based on this data, the server neural network 307 may be arranged to generate an output image which corresponds to a view image for a different pose than the input view poses.

In more detail, the server neural network 307 may be a convolutional neural network.

Before being input to the neural network, the 3D spatial data and/or the multi-view data may pass through a function/operation that depends on source view parameters and/or target view parameters.

Figure 5:
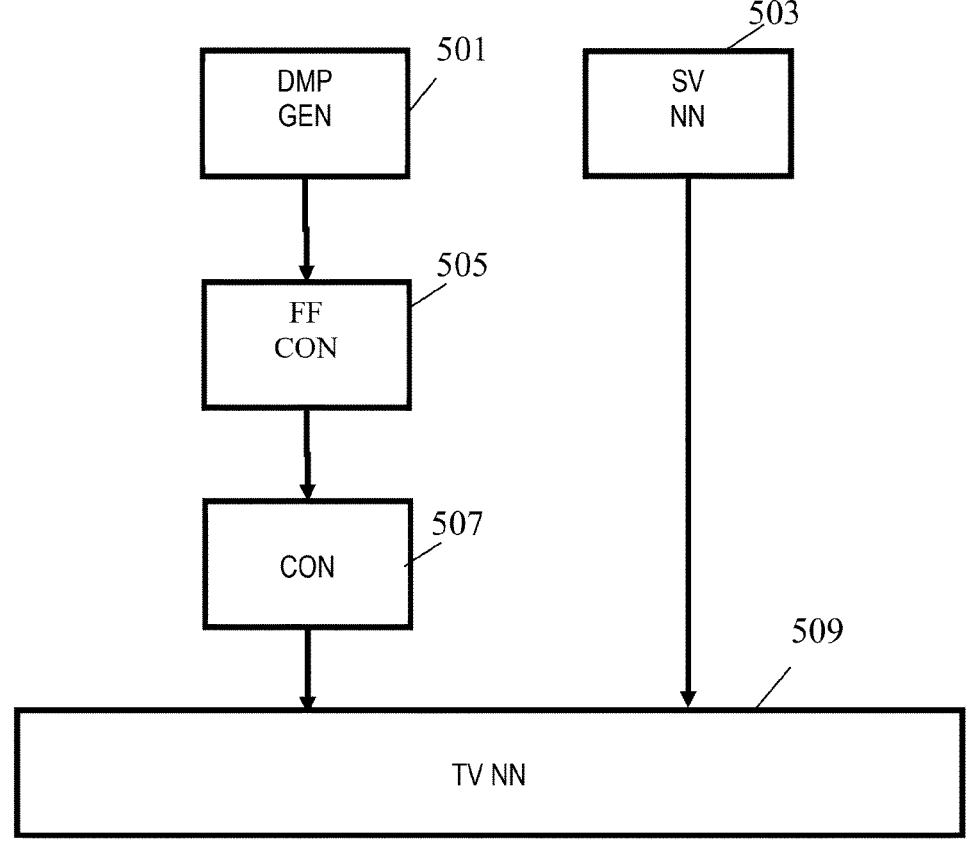
FIG. 5 illustrates an example of a view synthesis neural network.

In the following an advantageous example approach will be described with reference to FIG. 5.

A Depth Map Generator 501 Generating a Depth Map for the Target View

The 3D spatial data are generally not tied to a given source viewpoint but known or specified in a common world coordinate system. They are typically very accurate. As an example, a single laser that captures a point-cloud may be used. As a first step, a depth map may be generated by projecting this point-cloud to the target view. Possible holes may be filled via interpolation and/or extrapolation.

A Source View Convolutional Network 503

This network may take as input a full resolution 3 (color) channel source view image and stack a small number of convolutional layers (e.g. 2 layers) each with a stride (step [pixels]) larger than 1 to downscale the consecutive feature maps corresponding to each layer. For three layers, a stride of 4 may be useful. As layers are stacked the number of feature maps (=channels) may be increased from the 3 input layers to 8 for the two layers that follow the input (=image) layer. It is important to realize that these layers 'live' in the source view image coordinates. Note that as is common, each convolutional operation (which is linear) is followed by a non-linear (so called activation) function. We propose to use a Rectified Linear Unit (ReLU) but other approaches are of course possible.

A Generator 505 Generating a Flow-Field from the Target View to Each Source View Now that an (accurate) depth map for the target view has been generated, we can use this depth map to calculate a so-called flow field that maps each pixel in the source view to a corresponding pixel in each target view. If the source view parameters are accurately calibrated and the laser (or other means) provides accurate 3D data, this mapping will also be very accurate. However, occlusion by a point in the source view is not detected and hence this needs to be resolved by a target view convolutional network (see later). Calculation of the flow field and retrieval of source view pixels to the target view can be done with (sub millisecond) speed on an average GPU.

A Connection Circuit 507 for Connecting N Source View Networks to the Target View Network 509

To allow end-to-end training a function graph where all functions are differentiable may be used. Since the flow-field is defined from the target view back to each source view, it is differentiable and can hence be inserted as a separate layer, between other layers in a neural network. Frameworks such as PyTorch allow the definition of such a 'warp layer'. Specifically, for PyTorch this layer is torch.nn.functional. grid_sample. See for reference: https://pytorch.org/docs/stable/generated/torch.nn.functional.grid_sample.html. In the example, the output of a given source view layer, which is a 4D tensor (batch size, channels, height, width), is fetched with the flow-field to the target view where it is represented at a specified resolution. The resolution may be exactly the target view resolution or a lower resolution. In many cases, the resolution may be the same as that from the specific layer in the source view. In the specific example, both the high resolution source view input layer (=actual source view image) and the low resolution output layer (final feature maps) of the source view network.

Target View Convolutional Network 509

The target view network takes as input the now warped layers from a (subset of) the source views. This network takes as additional input the depth map that was provided by the laser data. The approach may continue with two separate branches:

1. Depth based blend weight calculation branch: The branch that takes the depth map as input is followed by two convolutional layers using a 3×3 kernel with an upscaling step before each convolution. The output layer is specified to output a N channels at the target view resolution where N is the number of source view used.

2. Image based blend weight calculation branch: This branch takes as input the warped source view output layers (feature maps), upscales to target view resolution, convolves with a 3×3 kernel and outputs also an N-channel weight tensor, one for each source view.

Each branch provides an independent cue (based on depth variation or color differences) for how to perform occlusion aware blending. In the example, the simplest solution is implemented which is to just average these weights resulting in a final blend weight tensor. This tensor is normalized such that the sum over channels equals 1 and then multiply which the concatenated warped source view tensor. The result of this is summed over the channels to obtain the predicted target view image. Note that this is done per warped source view color channel.

Note that for training, a source view may be used as ground-truth using the known leave-one-out strategy.

It should be noted that the above strategy of having a network in each source view has the advantage that the source view network can calculate features that after warping to the target will be informative of occlusion and texture variation. It can help to better suppress occluded pixels in the blend operation.

More information on neural networks for view synthesis operations may for example be found in Tewari et. al. "Advances in Neural Rendering", *Computing Research Repository (CoRR)* volume={abs/2111.05849}, 2021, https://arxiv.org/abs/2111.05849, arXiv, timestamp={Tue, 16 Nov. 2021 12:12:31+0100}.

The server 103 further comprises a neural network trainer 309 which is arranged to train the server neural network 307.

The neural network trainer 309 may use a training set comprising a large number of images/frames of the scene from different view poses.

The neural network trainer 309 may use any suitable training approach including implementing a gradient descent based on a cost function determined from the training data/reference images.

In more detail, one of the available optimizers available in the frameworks such as PyTorch or TensorFlow may be used. Specifically, the so called Adam optimizer may be used as e.g. described in https://pytorch.org/docs/stable/generated/torch.optim.Adam.html?highlight=adam#torch.optim.Adam or Diederik P. Kingma and Jimmy Ba Adam: "A Method for Stochastic Optimization". 3*rdInternational Conference for Learning Representations*, San Diego, 2015.

The neural network trainer 309 may thus train the server neural network 307 for the task of generating view images for different view poses. Specifically, based on the images/frames and the 3D spatial data that is included in the audio visual data stream, the trained server neural network 307 is configured to generate view images/frames of the scene from different view poses. The coefficients/weights for the connections to the nodes/artificial neurons and/or for the kernels/filters of convolutional layers are adapted/trained to perform such view shifting with high quality.

In many embodiments (as will be described in more detail later), the nodes/neurons may have/be assigned a value that is determined as a weighted combination of input values from nodes of the previous layer. The weighted combination has coefficients, with these being determined by training.

In many scenarios, the node value may further comprise a bias value, which may also be determined by the training process. In some embodiments, the generated audiovisual data stream may in addition to coefficient data also include data describing the bias values of nodes.

In the approach, the coefficients/weights of the trained network (or at least some of these coefficients) are fed to the data stream generator 305 and included in the audio visual data stream. Thus, coefficient data describing coefficients of the view synthesis neural network after training is included in the audio visual data stream.

The coefficients may include coefficients of filters/kernels for one or more convolutional layers. The coefficients may include weights for connections of one or more fully connected layers.

The client 101 comprises a receiver 401 which receives the audio visual data stream generated by the server 103.

The client 101 further comprises a view synthesis neural network, which henceforth will be referred to as the client neural network 403. The client neural network 403 is fed the received images/frames and the received 3D spatial data from the received audio visual data stream. The client neural network 403 is then arranged to synthesize images for different view poses based on these images and on the spatial data.

The server neural network 307 may be arranged to receive a set of images, which specifically may be frames of a video sequence, for different view poses and it may further receive the 3D spatial data. Based on this data, the client neural network 403 may be arranged to generate an output image which corresponds to a view image for a different pose than the view poses of the received images.

In many cases, the audio visual data stream may include video sequences of frames representing views of the scene from different view poses. The client neural network 403 may then generate an output video sequence comprising frames representing views of the scene from a view pose that may change dynamically. The output frames are generated by applying the client neural network 403 structure and operation to the received images/frames and spatial data.

The client neural network 403 and the server neural network 307 may specifically be implemented with identical structures, and thus may have the same layers, nodes/neurons, connections etc. Comments provided with respect to the server neural network 307 also apply to the client neural network 403 mutatis mutandis, and vice versa.

The client 103 further comprises a neural network controller 405 which is coupled to the receiver 401 and the client neural network 403. The neural network controller 405 is arranged to control the setting of the coefficients/weights of the client neural network 403. Specifically, the neural network controller 405 is arranged to process the received coefficient data to extract the neural network coefficients encoded in the audio visual data stream. The client neural network 403 is then arranged to set the coefficients of the client neural network 403 from the received coefficient data. The neural network controller 405 may set the coefficients of the client neural network 403 to the values provided in the coefficient.

Thus, the neural network controller 405 may be arranged to setup the client neural network 403 to be identical to the trained server neural network 307, and thus the trained server neural network 307 is replicated at the client 103. The neural network controller 405 may then setup the client neural network 403 to function in the same way as the trained server neural network 307 thereby ensuring that the client neural network 403 may perform high quality view shifting/image/frame synthesis.

The client 103 may include a viewpose generator 407 which generates view poses for which view images/frames are generated. For example, the viewpose generator 407 may be arranged to receive a view pose for a viewer (and specifically in the scene). The view pose may represent a position and/or orientation from which the viewer views the scene, and it may specifically provide a pose for which views of the scene should be generated. It will be appreciated that many different approaches for determining and providing a view pose is known and that any suitable approach may be used. For example, the viewpose generator 407 may be arranged to receive pose data from a VR headset worn by the user, from an eye tracker, etc.

The viewpose generator 407 may provide the view pose to the client neural network 403 which then generates output view images/frames for the given view pose based on the received images and 3D spatial data.

The client neural network 403 is coupled to a renderer 409 which is arranged to render the generated image(s)/frames generated by the client neural network 403. The renderer may specifically generate a display signal representing the images/frames. The display signal may be fed to a display which may display the generated view images/frames to the viewer/user.

In the approach, view synthesis and shifting may thus be based on a neural network approach typically resulting in a high quality images and/or reduced complexity. Further, the approach may allow the advantageous operation to be performed without any requirement for training of the neural network at the client side. Rather, training may be performed at the server side. This may typically allow improved training as more appropriate training data is often available at the server side. Often the server side may have access to additional images for the scene that is not communicated to the client side. Further, whereas the inclusion of a neural network and training operation for generating view shifting at a server side where the resulting images of such an operation are not necessary and often discarded may increase complexity at the server side, this is typically heavily outweighed by the potential quality improved for the operation and the client side and the reduced computational requirements at the client side. This is typically a substantial advantage as a single server may often serve a plurality and possibly many clients.

In the approach a server or other source apparatus may encode images such as video frames, spatial data and neural network coefficients in a bitstream. The neural network coefficients may be determined before encoding with the intention to maximize the view synthesis quality given the limited pixel space in a video atlas and with the available spatial data. The video frames may be (a subset of) the received source views, or a transformation thereof.

As a specific example, multi view data and depth data (e.g. collected using a laser) may be input to a synthesis neural network (the server neural network 307). The coefficients of the neural network may be separately encoded or may e.g. be coded as video using a video atlas.

It will be appreciated that any suitable approach for training the server neural network 307 (and thus implicitly the client neural network 403) may be used dependent on the specific preferences and requirements of the individual embodiment.

In many embodiments, the neural network trainer 309 is arranged to train the server neural network 307 using a training set of images that includes the images received by the first receiver 301. Specifically, input images (such as specifically frames of a video sequence) capturing the scene from different view poses may be received. Some or all of these may be provided to the data stream generator 305 and included in the audio visual data stream. These images may be used as inputs to the neural network when performing view synthesis. In addition, the received captured images may be used as reference images for the training of the server neural network 307.

The neural network trainer 309 may specifically be arranged to train the server neural network 307 by minimizing a cost function that reflects the difference between synthesized images generated for different view poses and reference images for the same view poses. In some scenarios, the synthesized view poses may correspond to view poses for which captured images are also received and these images may be used as the reference images.

In many embodiments, the training and fitting of parameters is performed with the input to the server neural network 307 having been processed in accordance with at least some of the processing that occurs as part of the communication to the client neural network 403.

Specifically, the neural network trainer 309 may be arranged to encode and decode some or all of the input images prior to providing them to the client neural network 403 as input images. The encoding and decoding may be in line with the encoding performed by the data stream generator 305 and the complementary decoding performed at the client 103. Thus, the images provided to the server neural network 307 may more closely correspond to the images that are provided to the client neural network 403 when this performs image synthesis. The encoding and decoding operation may include all operations performed as part of the transmission path including e.g. pruning, packing or pixel rate reduction in general.

Similarly, the neural network trainer 309 may be arranged to encode and decode the three dimensional spatial data for the scene prior to this being provided to the view synthesis neural network. The encoding and decoding may be the same operations as are applied to the spatial data as part of the communication to the client neural network 403. The spatial data provided to the server neural network 307 may thus more closely correspond to that provided to the client neural network 403.

The encoding and decoding operations may be dynamically adapted to reflect the specific encoding and decoding parameters that are currently used for communicating the data to the client 103.

Whereas the data provided to the client neural network 403 for synthesis may be processed to reflect impact and degradation resulting from the communication operation, the reference images are not subjected to such processing but rather input images used as reference images are used unchanged.

Such an approach may allow an improved training of the server neural network 307 and specifically may allow a client neural network 403 to be implemented based on the received coefficients which may not only be optimized for view shifting, but which may also mitigate/compensate some of the impact of the communication operation. Indeed, for a given set of coding parameters, the training of the neural network uses non-ideal data having gone through video/image compression (both images and spatial data) but still optimizes the synthesis network to predict the ideal data.

Typically, the set of captured images and capture positions are relatively limited and this may potentially affect the accuracy of the training of the server neural network 307. In many embodiments, the neural network trainer 309 is arranged to train the server neural network 307 using a training set of images that comprises reference images for view poses that are not represented by input images.

Figure 6:
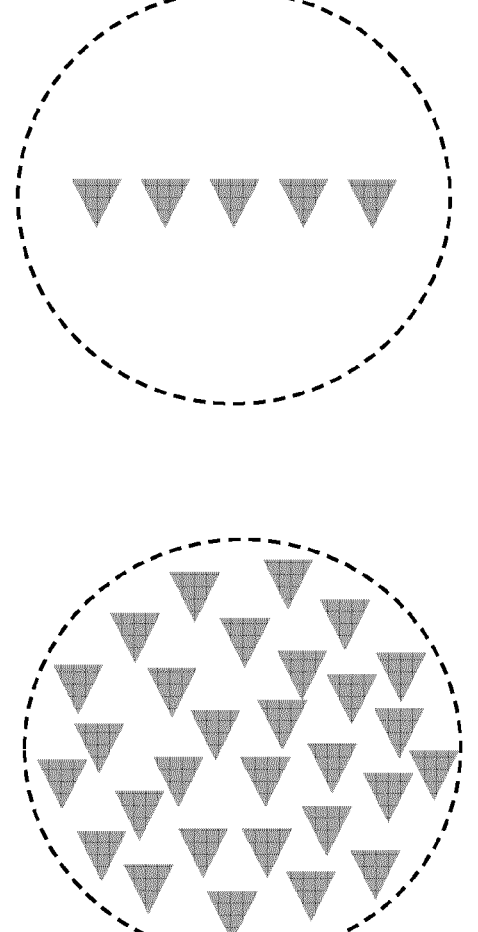
FIG. 6 illustrates an example of poses for training images for training a view synthesis neural network.

For example, a set of training data may be generated to include view poses distributed over a given area which for example may correspond to a target view region. For example, as illustrated in the upper example of FIG. 6, input data may be received for five view poses. For example, a scene may be captured by five different cameras. The input images may in this case be provided for five different poses and these images may be provided to the server neural network 307 as input images and may be communicated to the client neural network 403.

However, in order to provide additional training data, and for this to represent an increased range of view poses, reference images may be generated for other view poses than the capture poses. These additional reference images may be generated to be distributed over the expected viewing region as illustrated by the example of the lower figure of FIG. 6. Thus, not only can additional images be used for training, but these can be generated to cover a wider area thereby providing better training of the neural network for synthesis of images over the entire expected viewing region.

The additional reference images may in some embodiments be generated by view shifting based on the captured input images where the view shifting is not based on the neural network. Thus, for a given view pose in the viewing region, a view synthesis operation may be performed based on the input images to generate a view image for that view pose.

The view synthesis operation is performed using a view synthesis operation that is not based on the server neural network 307. It will be appreciated that many different view shifts and image synthesis algorithms are known to the skilled person and that any suitable approach may be used.

In some embodiments, some or all of the additional reference images may be generated by processing a visual scene model, such as a graphics model, of the scene. For example, for a virtual scene, a model may be provided that for different view poses can be evaluated to generate view images for the view poses. It will be appreciated that many different approaches for generating and evaluating a visual scene model are known to the skilled person and that any suitable approach may be used.

In some embodiments, the training data may thus comprise a set of reference images that correspond to the input captured images and a set of reference images that are for non-capture view poses. The images of the latter set of reference images will also be referred to as reference images to reflect that they may typically be generated by non-neural network based view shifting or model evaluation.

In such embodiments, the neural network trainer 309 is arranged to apply different weightings to the different sets of reference images. In particular, the reference images that correspond to input images may be weighted higher than the simulated reference images when training and fitting the neural network. The weighting of the different reference images may specifically be done by weighting the images differently when generating the cost function used for the training (e.g. by the gradient descent approach). For example, an error determined for an input image may contribute more to the cost function than a corresponding error determined for a simulated image. In many embodiments, improved training may be achieved by differentiated weighting for different types of reference images.

The described approach may mitigate the risk that the neural network is trained to substantially only learn to predict virtual view poses that are part of the capture configuration since the source view poses are the only poses that the network can train on if only the input images are used as reference images. The issue may be mitigated by adding simulated reference images/sample data to the training set.

The approach may specifically include a dataset dependent cost function with a weight a between zero and one that balances viewing zone extrapolation quality and overfitting on the captured source views. For example, a cost function may be determined as the sum of contributions which for each image is given by:

$$C = \begin{cases} (1-\alpha)\|\hat{y} - y\|_2 \text{ if } x, y \in \text{ simulated data} \\ \alpha\|\hat{y} - y\|_2 \text{ if } x, y \in \text{ captured data} \end{cases}$$

x is a source view image, y is a ground-truth target view image, and $\hat{y}$ is target view image as predicted by the neural network. Parameter $\alpha$ can be increased to give more weight to actually captured data from the capture in comparison to the simulated data.

In some embodiments, the training of the server neural network 307 may be based on evaluating the output using a second neural network which is trained to evaluate the output quality of images of the client neural network 403.

In some embodiments, the server neural network 307 and/or the client neural network 403 may be initialized with a set of default coefficients. For example, a set of default coefficients that have been found to be efficient for many general scenes and scenarios may be stored. The default coefficients may for example be shared between the server and the client (e.g. during previous sessions), and thus the same default coefficients may be loaded into the server neural network 307 and the client neural network 403.

In such a system, the neural network trainer 309 may initialize the server neural network 307 with the default coefficients and may then initialize the training sequence based specifically on the received video sequences/images/frames. Based on the training, modified coefficients may be determined and some or all of these may be included in the audio visual data stream and sent to the client.

Similarly, the neural network controller 405 may initialize the client neural network 403 with default coefficients, which may e.g. be fixed coefficients or may e.g. be coefficients stored during a previous session. When initializing a new session, the neural network controller 405 may accordingly be arranged to start operation immediately and without requiring that neural network coefficients are received from the server.

As the modified coefficients are determined by the training operation, these may be included in the audio visual data stream and when received by the client, the neural network controller 405 may proceed to set the coefficients of the client neural network 403 to these modified values. Thus, the client neural network 403 may start with default coefficients which are then updated as modified coefficients are received. In some embodiments, the neural network controller 405 is accordingly arranged to initialize the neural network with default coefficients and to override default coefficients by coefficients determined from the coefficient data.

In some embodiments, the data stream generator 305 may be arranged to include all modified coefficients in the audio visual data stream when a training operation is completed. Thus, all coefficients determined for the client neural network 403 may be included. Similarly, when received at the client, the neural network controller 405 may be arranged to set all coefficients of the client neural network 403 to the values received from the server.

In some embodiments, only a subset of the coefficients may be communicated. Specifically, data stream generator 305 may select a subset of coefficients for transmission in response to the differences between the modified coefficients and the default coefficients. For example, only modified coefficients that differ from the default (or previous) coefficients by more than a threshold may be transmitted to the client. Similarly, when receiving coefficient data that only comprises values for a subset of the coefficients, the neural network controller 405 may proceed to modify only these coefficients. Such an approach may reduce the data rate required to communicate coefficients and may reduce the data rate of the audio visual data stream and/or allow a faster update rate for neural network coefficients.

In some embodiments, the neural network trainer 309 and/or the neural network controller 405 is arranged to select the default coefficients from a plurality of sets of default coefficients. For example, a number of different sets of coefficients may be stored. The neural network trainer 309 and/or the neural network controller 405 may then select between these based on the images that are received.

For example, coefficients may have been determined during previous training sequences for a capture of a scene during daytime hours on a bright summer day, during dusk on a summer day, during a snowy winter day, during a cloudy and drizzly day in autumn etc. The corresponding default coefficient sets may be stored.

When a new session is initialized, the neural network trainer 309 and/or the neural network controller 405 may analyze one or more of the initial images to determine which stored scenario is most likely to be represented. For example, a selection may be based on brightness and color parameters. If the image is very bright and contains many warm colors, the coefficients for a summer day may be selected, if colors are de-saturated and the brightness is relatively low, the coefficients for the autumnal day may be selected, if the image is bright and the predominant color is white the coefficients for the winter day may be selected.

The Coefficient sets may in some embodiments differ for hardware type/setting (camera brand, exposure setting, etc.) etc.

Such an approach may provide improved initial operation and may facilitate and improve initial training as well as reduce the perceptual impact of subsequent update of the coefficients.

In many embodiments, the approach may as described be used with video sequences and thus time varying images may be provided. Each video sequence may for example be temporal series of frames and the neural networks may be arranged to generate a frame for a given time instant by applying the neural network operation to input frames for that time instant. For example, the nearest (in time) frame to the time instant for which the frame is generated may be selected in each video sequence and the neural network operation may be applied to these.

Thus, in some embodiments, the audio visual data stream includes time varying video data. In many embodiments, the audio visual data stream may include time varying coefficient data for the neural networks.

For example, the neural network trainer 309 may be arranged to iteratively perform training of the server neural network 307. For example, at regular intervals, the neural network trainer 309 may control the server to perform a training of the server neural network 307 resulting in new updated coefficients being generated. These updated coefficients may then be encoded and included in the audio visual data stream. Thus, the audio visual data stream may, e.g. with regular intervals, comprise coefficient data with new modified coefficients. The new modified coefficients may further be applied to the server neural network 307 and used as initial coefficients for the next training operation.

The client 103 may receive the audio visual data stream with this time varying coefficient data describing time varying coefficients of the view synthesis neural network, and it may change the coefficients of the neural network in response to the time varying coefficient data, typically by overwriting some or all of the coefficients of the client neural network 403.

In many embodiments, the neural network controller 405 may be arranged to update the coefficients when new data is received. However, in some embodiments, the neural network controller 405 may also be arranged to update the coefficients, i.e. to apply time varying coefficients for the client neural network 403, when no coefficients are received.

In many embodiments, the neural network controller 405 may be arranged to generate interpolated coefficients for time instants for which no coefficient data is provided. For example, when the audio visual data stream includes a new set of coefficients for some discrete time instants, e.g. at regular time intervals, the neural network controller 405 may interpolate for times in between such time instants determine coefficients by interpolating from the received coefficients. The client neural network 403 may accordingly be updated more frequently than the frequency of new coefficients being received by using interpolated coefficients to overwrite the current coefficients.

As a specific example, the audio visual data stream may include new coefficient data with regular intervals of, say 10 seconds. The neural network controller 405 may however interpolate between the provided coefficient values to generate new modified coefficient values e.g. every second. The neural network controller 405 may then update the coefficients of the client neural network 403 every second.

Such an approach may allow a substantially reduced data rate and/or reduced computational burden as the time and computationally demanding training operations can be performed less frequently and less additional data being generated and communicated. However, improved quality may still be achieved by providing a better update rate for the client neural network 403 operation.

It will be appreciated that any suitable approach for determining interpolated coefficients may be used. For example, interpolation may be performed separately and individually for each coefficient and e.g. a simple linear interpolation may be performed between the received coefficient value for the time prior to and the received coefficient value for the time after the current time instant. In other embodiments, more complex interpolation operations may be used.

In some embodiments, the coefficient data may provide values for all coefficients of the neural networks. However, in some embodiments, the coefficient data may include data for only a subset of the coefficients.

In some embodiments, the neural networks may be arranged to have a number of tuneable layers and a number of non-tuneable layers. The non-tuneable layers may be layers for which the coefficients are fixed and non-changeable. Specifically, the coefficients for non-tuneable layers are not modified or changed by training. The coefficients for the non-tuneable layers may for example be set to predetermined default values with these then being fixed and not modified when the neural network trainer 309 performs training of the server neural network 307. For example in the described embodiment the source view network parameters may be assumed constant and known by the client while only the target view network parameters are transmitted.

The tuneable layers have varying coefficients and specifically comprise coefficients that may be modified or changed by the training operation. Thus, when performing training of the server neural network 307, only coefficients for the tunable layers are changed/optimized.

In such embodiments, the data stream generator 305 may be arranged to include coefficients only for the tunable layers but with no coefficients for the non-tuneable layers being included.

The neural network controller 405 may at the client be arranged to implement the client neural network 403 to correspondingly comprise one or more non-tuneable layers that have fixed coefficients. In addition, the client neural network 403 is implemented to have one or more tunable layers. The neural network controller 405 may be arranged to set the coefficients for the non-tunable layers to the default values (or these may e.g. be fixedly implemented as part of the client neural network 403) and to set the coefficients of the tuneable layers based on the coefficient data.

Such an approach may specifically be combined with the dynamic approach of time varying coefficient data with the time varying coefficient data being provided only for the tuneable layer.

The employment of tuneable and non-tuneable layers may be highly advantageous for the described approach as the combination of adaptable and fixed layers is particularly suitable for view synthesis based on distributed learning. In particular, partial adaptation of training may in some cases allow a substantially reduced data rate as fewer coefficients are communicated yet high quality results can be achieved.

In some embodiments, the server may be arranged to transmit a feature map for an image. For example, rather than include a specific image in the audio visual data stream, the server may proceed to extract a set of feature values for a given layer of a convolutional neural network forming the server neural network 307.

For example, in the specific example of the convolutional network described previously, the server could pack the low-resolution output layer of the source view network and send it to the client, e.g. using a suitable atlas approach. This may have a client computational benefit (there is no need to evaluate the first part of the network). On chip HEVC decoding of video pixel data may often be faster and less power consuming than using a GPU or even a dedicated neural engine of the client device.

Thus, rather than providing an explicit image, the feature values that are generated by applying appropriate filters may be communicated. The feature map is specifically provided for a pose that is not represented by any of the images/frames that are included in the audio visual data stream and thus may represent the scene from an additional view pose. The feature map will represent the view image from the corresponding view pose but will typically have a much lower resolution and thus the data rate of the audio visual data stream can be substantially reduced in comparison to sending the full image.

As a specific example, an approach may be employed which packs a low-resolution output layer of the source view network and sends it in an atlas to the client. This could have a client computational benefit (no need to evaluate the first part of the network). Further, on chip HEVC decoding of video pixel data may often be faster and less power consuming than using a GPU or even a dedicated neural engine of a client device.

The audiovisual data stream may thus in some embodiments include at least one neural network feature map for an image of a view pose that is different from the view poses of the plurality of images.

The neural network controller 405 may then be arranged to extract the feature values and to configure the neural network with the at least one feature map. Specifically, the values of the nodes of the layer for which the feature map is provided may be set to the feature values indicated in the feature map.

The client neural network 403 may then perform the second part of the neural network.

Such an approach may typically be advantageous for view synthesis operations based on neural networks The data stream generator 305 may be arranged to generate the audio visual data stream to be in accordance with any suitable data format, structure, or standard. In many embodiments, the audio visual data stream may be generated to be in accordance with a video data structure comprising video data as well as meta or auxiliary data that may include the coefficient data and/or the spatial data.

In many embodiments, the data stream generator 305 may be arranged to structure the coefficient data to fit with the video data and structure.

Specifically, the video data (the image data for the frames that are included in the audio visual data stream) may be encoded using interframe prediction. The video encoding may employ a Group Of Pictures (GOP) structure. In such GOP structures, frames are divided into GOPs with each GOP being a collection of frames that can be decoded without requiring information from pictures/frames belonging to another GOP. Within a given GOP, interframe prediction and relative encoding is based only on other frames that are part of the same GOP and is not based on any frames of another GOP. Thus, interframes are encoded based only on other frames of the same GOP. Each GOP will typically comprise at least one intraframe. The GOP structure may reflect the arrangement of interframes and intraframes for a set of frames.

In some embodiments, the data stream generator 305 may be arranged to structure at least two of the image data, the scene data, and the coefficient data share a GOP structure. Specifically, the data stream generator 305 may be arranged to structure the scene data and/or the coefficient data to use the same GOP structure as the images/video frames.

For example, a new set of coefficients may be provided for each GOP structure. E.g. a set of coefficients may be provided for an intracoded frame as a set of intracoded coefficients. Coefficients may then further be provided for intercoded frames with the coefficients also being intercoded based on coefficients provided for other frames, and specifically may be encoded as relative values relative to coefficients from the intracoded coefficients provided for the intracoded frame.

Such an approach may allow an efficient and practical approach for communicating coefficients.

Figure 7:
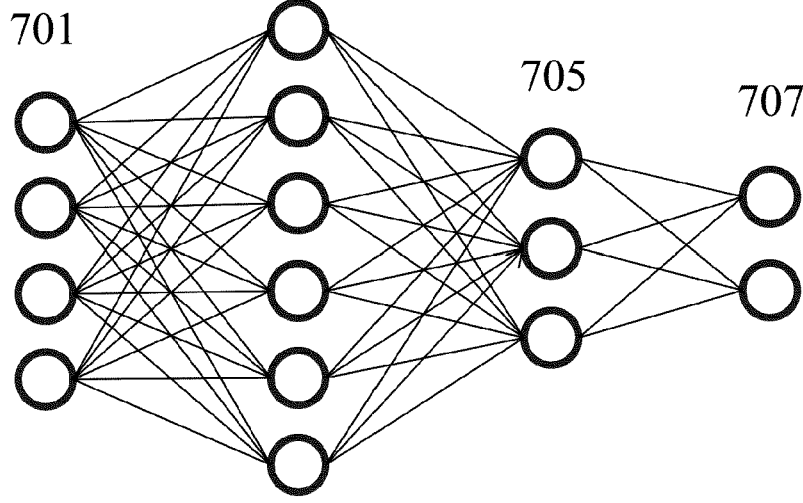
FIG. 7 illustrates an example of a structure of an artificial neural network.

An artificial neural network suitable for implementing the view synthesis neural networks may be a network of nodes arranged in layers and with each node holding a node value. FIG. 7 illustrates an example of a section of an artificial neural network.

The node value for a given node may be calculated to include contributions from some or often all nodes of a previous layer of the artificial neural network. Specifically, the node value for a node may be calculated as a weighted summation of the node values of all the nodes output of the previous layer, and thus weights/coefficients may be determined for the nodes (by the training). Typically, a bias may be added, and the result may be subjected to an activation function. The activation function provides an essential part of each neuron by typically providing a non-linearity. Such non-linearities and activation functions provides a significant effect in the learning and adaptation process of the neural network. Thus, the node value is generated as a function of the node values of the previous layer.

The artificial neural network may specifically comprise an input layer 701 comprising a plurality of nodes receiving the input data values for the artificial neural network. Thus, the node values for nodes of the input layer may typically directly be the input data values to the artificial neural network and thus may not be calculated from other node values.

The artificial neural network may further comprise none, one, or more hidden layers 703 or processing layers. For each of such layers, the node values are typically generated as a function of the node values of the nodes of the previous layer, and specifically a weighted combination and added bias followed by an activation function (such as a sigmoid, ReLU, or Tanh function may be applied).

Figure 8:
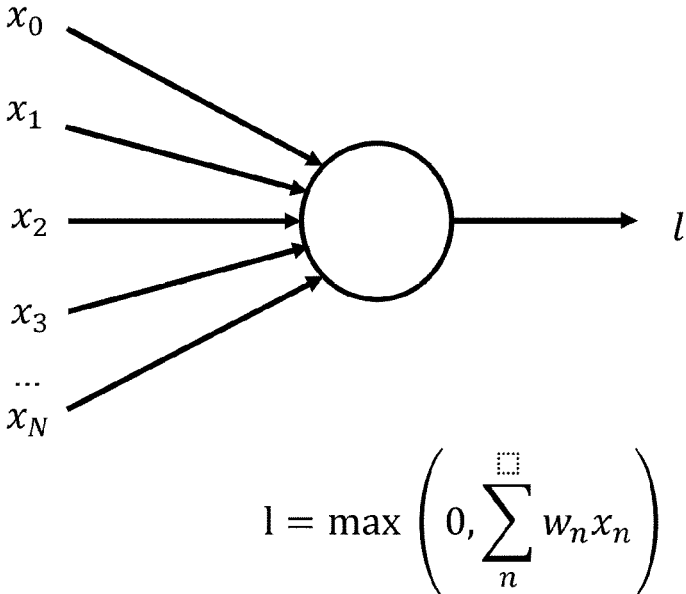
FIG. 8 illustrates an example of a node of an artificial neural network.

Specifically, as shown in FIG. 8, each node, which may also be referred to as a neuron, may receive input values (from nodes of a previous layer) and therefrom calculate a node value as a function of these values. Often, this includes first generating a value as a linear combination of the input values with each of these weighted by a weight/coefficient:

$$k = \sum_n w_n x_n$$

where w refers to weights, x refers to the nodes of the previous layer and n is an index referring to the different nodes of the previous layer.

In the described approach, coefficients/weights of the linear combination of the input values and/or values of nodes of the previous layer may be determined by training. The coefficients/weights determined by the training may then be described by the coefficient data included in the audiovisual data stream. In many embodiments, a bias value (offset) may be determined for one or more of the nodes, and in many embodiments, data describing the bias values may also be included in the audiovisual data stream.

An activation function may then by applied to the resulting combination. For example, the node value 1 may be determined as:

$$l = f(k)$$

where the function may for example be a Rectified Linear Unit function as described in Xavier Glorot, Antoine Bordes, Yoshua Bengio Proceedings of the Fourteenth International Conference on Artificial Intelligence and Statistics, PMLR 15:315-323, 2011):

$$f(k) = ReLU(k) = \max(0, k)$$

Other often used functions include a sigmoid function or a tanh function. In many embodiments, the node output or value may be calculated using a plurality of functions. For example, both a ReLU and Sigmoid function may be combined using an activation function such as:

$$f(k) = ReLU(k) + \sigma(k)$$

Such operations may be performed by each node of the artificial neural network (except for typically the input nodes).

The artificial neural network further comprises an output layer 705 which provides the output from the artificial neural network, i.e. the output data of the artificial neural network is the node values of the output layer. As for the hidden/processing layers, the output node values are generated by a function of the node values of the previous layer. However, in contrast to the hidden/processing layers where the node values are typically not accessible or used further, the node values of the output layer are accessible and provide the result of the operation of the artificial neural network.

A number of different networks structures and toolboxes for artificial neural network have been developed and in many embodiments the artificial neural network may be based on adapting and customizing such a network. An example of a network architecture that may be suitable for the applications mentioned above are Long short-term memory (LSTM)[by Sepp Hochsreiter which is described in Hochreiter, Sepp, and Jürgen Schmidhuber. "Long short-term memory." Neural computation 9.8 (1997): 1735-1780. LSTM are an architecture used for classification and regression of time domain signals using recurrent causal or bidirectional evaluation, and has been successfully applied to audio signals. For $$f_t = \sigma_g(W_f * x_t + U_f * h_{t-1} + V_j \circ c_{t-1} + b_f)$$

where * denotes matrix multiplication, o denotes an Hadamard product, x is the input vector, $h_{t-1}$ denotes the output vector of the previous time step, W, V, U are the network wights, while b is a bias vector.

In theory, classic (or "vanilla") artificial neural networks can keep track of arbitrary long-term dependencies in the input sequences. The problem with vanilla artificial neural networks is computational (or practical) in nature: when training a vanilla artificial neural network using back-propagation, the long-term gradients which are back-propagated can "vanish" (that is, they can tend to zero) or "explode" (that is, they can tend to infinity), because of the computations involved in the process, which use finite-precision numbers. artificial neural networks using LSTM units partially solve the vanishing gradient problem, because LSTM units allow gradients to also flow unchanged. However, LSTM networks can still suffer from the exploding gradient problem.

An artificial neural network may in some cases further be arranged to include additional contributions that allow the artificial neural network to be dynamically adapted or customized for a specific desired property or characteristics of the generated output. For example, a set of values may be provided to adapt the artificial neural network. These values may be included by providing a contribution to some nodes of the artificial neural network. These nodes may be specifically input nodes but may typically be nodes of a hidden or processing layer. Such adaptation values may for example be weighted and added as a contribution to the weighted summation/correlation value for a given node.

The above description relates to a neural network approach that may be suitable for many embodiments and implementations. However, it will be appreciated that many other types and structures of neural network may be used. Indeed, many different approaches for generating a neural network have been, and are being, developed including neural networks using complex structures and processes that differ from the ones described above. The approach is not limited to any specific neural network approach and any suitable approach may be used without detracting from the invention.

Artificial neural networks are adapted to specific purposes by a training process which is used to adapt/tune/modify the weights and other parameters (e.g. bias) of the artificial neural network. It will be appreciated that many different training processes and algorithms are known for training artificial neural networks. Typically, training is based on large training sets where a large number of examples of input data are provided to the network. Further, the output of the artificial neural network is typically (directly or indirectly) compared to an expected or ideal result. A cost function may be generated to reflect the desired outcome of the training process. In a typical scenario known as supervised learning, the cost function often represents the distance between the prediction and the ground truth for a particular input data. Based on the cost function, the weights may be changed and by reiterating the process for the modified weights, the artificial neural network may be adapted towards a state for which the cost function is minimized.

In more detail, during a training step the neural network may have two different flows of information from input to output (forward pass) and from output to input (backward pass). In the forward pass, the data is processed by the neural network as described above while in the backward pass the weights are updated to minimize the cost function. Typically, such a backward propagation follows the gradient direction of the cost function landscape. In other words, by comparing the predicted output with the ground truth for a batch of data input, one can estimate the direction in which the cost function is minimized and propagate backward, by updating the weights accordingly. Other approaches known for training artificial neural networks include for example Levenberg-Marquardt algorithm, the conjugate gradient method, and the Newton method etc.

In the present case, training may specifically include a training set comprising a potentially large number of pairs of a captured audio signals and measured breathing waveform signals. The measured breathing waveform signal may be generated from a sensor signal of a sensor arranged to measure a property dependent on the lung air volume. The training of the artificial neural network may thus be performed using a training set comprising linked audio/speech data/signals and sensor data/signals representing of lung air volume measurements during the speech.

In some embodiments, training data may be audio signals in time segments corresponding to the processing time intervals of the artificial neural networks being trained, e.g. the number of samples in a training audio signal may correspond to a number of samples corresponding to the input nodes of the artificial neural network(s) being trained. Each training example may thus correspond to one operation of the artificial neural network(s) being trained. Usually, however, a batch of training samples is considered for each step to speed up the training process. Furthermore, many upgrades to gradient descent are possible also to speed up convergence or avoid local minima in the cost function landscape.

The apparatus(s) may specifically be implemented in one or more suitably programmed processors. For example, the neural networks may be implemented in one or more such suitably programmed processors. The different functional blocks, and in particular the artificial neural network, may be implemented in separate processors and/or may e.g. be implemented in the same processor. An example of a suitable processor is provided in the following.

Figure 9:
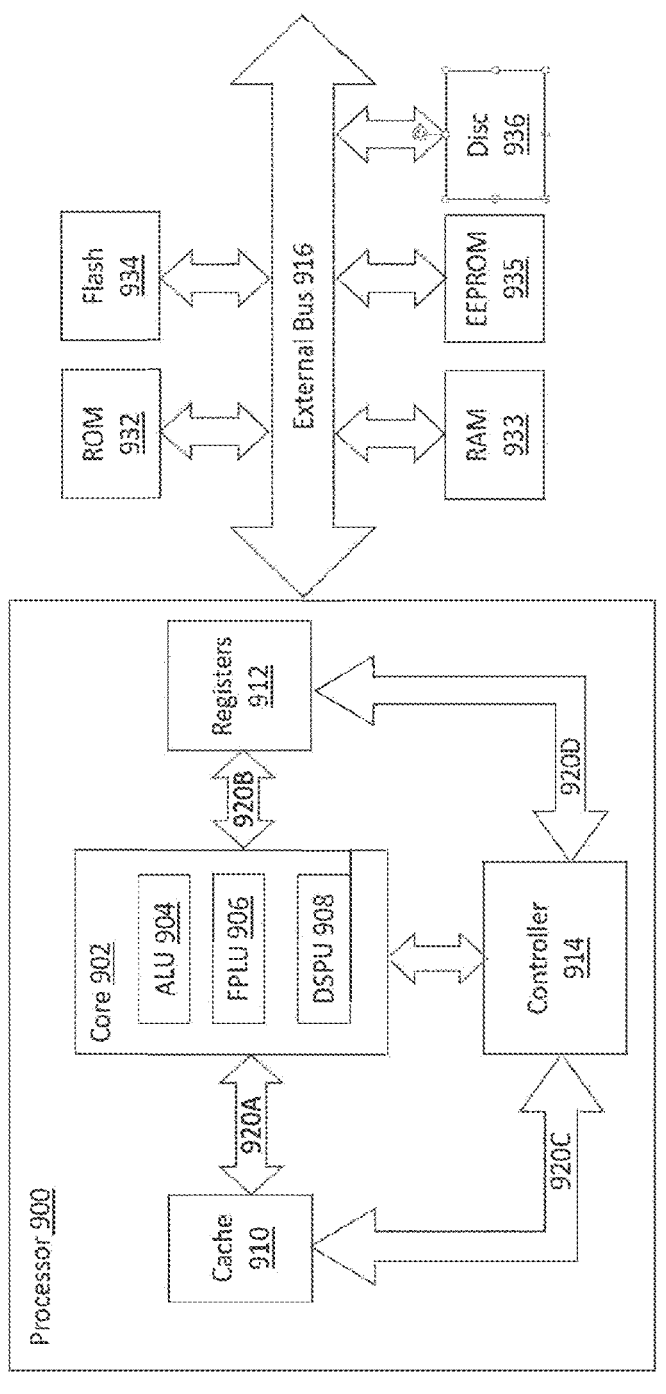
FIG. 9 illustrates some elements of a possible arrangement of a processor for implementing elements of an apparatus in accordance with some embodiments of the invention.

FIG. 9 is a block diagram illustrating an example processor 900 according to embodiments of the disclosure. Processor 900 may be used to implement one or more processors implementing an apparatus as previously described or elements thereof (including in particular one more artificial neural network). Processor 900 may be any suitable processor type including, but not limited to, a microprocessor, a microcontroller, a Digital Signal Processor (DSP), a Field ProGrammable Array (FPGA) where the FPGA has been programmed to form a processor, a Graphical Processing Unit (GPU), an Application Specific Integrated Circuit (ASIC) where the ASIC has been designed to form a processor, or a combination thereof.

The processor 900 may include one or more cores 902. The core 902 may include one or more Arithmetic Logic Units (ALU) 904. In some embodiments, the core 902 may include a Floating Point Logic Unit (FPLU) 906 and/or a Digital Signal Processing Unit (DSPU) 908 in addition to or instead of the ALU 904.

The processor 900 may include one or more registers 912 communicatively coupled to the core 902. The registers 912 may be implemented using dedicated logic gate circuits (e.g., flip-flops) and/or any memory technology. In some embodiments the registers 912 may be implemented using static memory. The register may provide data, instructions and addresses to the core 902.

In some embodiments, processor 900 may include one or more levels of cache memory 910 communicatively coupled to the core 902. The cache memory 910 may provide computer-readable instructions to the core 902 for execution. The cache memory 910 may provide data for processing by the core 902. In some embodiments, the computer-readable instructions may have been provided to the cache memory 910 by a local memory, for example, local memory attached to the external bus 916. The cache memory 910 may be implemented with any suitable cache memory type, for example, Metal-Oxide Semiconductor (MOS) memory such as Static Random Access Memory (SRAM), Dynamic Random Access Memory (DRAM), and/or any other suitable memory technology.

The processor 900 may include a controller 914, which may control input to the processor 900 from other processors and/or components included in a system and/or outputs from the processor 900 to other processors and/or components included in the system. Controller 914 may control the data paths in the ALU 904, FPLU 906 and/or DSPU 908. Controller 914 may be implemented as one or more state machines, data paths and/or dedicated control logic. The gates of controller 914 may be implemented as standalone gates, FPGA, ASIC or any other suitable technology.

The registers 912 and the cache 910 may communicate with controller 914 and core 902 via internal connections 920A, 920B, 920C and 920D. Internal connections may be implemented as a bus, multiplexer, crossbar switch, and/or any other suitable connection technology.

Inputs and outputs for the processor 900 may be provided via a bus 916, which may include one or more conductive lines. The bus 916 may be communicatively coupled to one or more components of processor 900, for example the controller 914, cache 910, and/or register 912. The bus 916 may be coupled to one or more components of the system.

The bus 916 may be coupled to one or more external memories. The external memories may include Read Only Memory (ROM) 932. ROM 932 may be a masked ROM, Electronically Programmable Read Only Memory (EPROM) or any other suitable technology. The external memory may include Random Access Memory (RAM) 933. RAM 933 may be a static RAM, battery backed up static RAM, Dynamic RAM (DRAM) or any other suitable technology. The external memory may include Electrically Erasable Programmable Read Only Memory (EEPROM) 935. The external memory may include Flash memory 934. The External memory may include a magnetic storage device such as disc 936. In some embodiments, the external memories may be included in a system.

The invention can be implemented in any suitable form including hardware, software, firmware, or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

In accordance with standard terminology in the field, the term pixel may be used to refer to a property associated with the pixel, such as a light intensity, depth, position of a part/element of the scene represented by the pixel. For example, a depth of a pixel, or a pixel depth, may be understood to refer to the depth of the object represented by that pixel. Similarly, a brightness of a pixel, or a pixel brightness, may be understood to refer to the brightness of the object represented by that pixel.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc. do not preclude a plurality. Reference signs in the claims are provided merely as a clarifying example shall not be construed as limiting the scope of the claims in any way.

The invention claimed is:

1. An apparatus comprising:
a first receiver circuit,
    wherein the first receiver circuit is arranged to receive a plurality of images of a scene,
    wherein the scene is captured from different view poses;
a second receiver circuit, wherein the second receiver circuit is arranged to receive three dimensional spatial data of the scene;
a view synthesis neural network circuit, wherein the view syntheses neural network circuit is arranged to generate view shifted images for the scene for different view poses from the plurality of images of the scene and the three dimensional spatial data;
a neural network trainer circuit wherein the neural network trainer circuit is arranged to train the view synthesis neural network circuit based on the plurality of images of the scene;
a generator circuit, wherein the generator circuit is arranged to generate a data stream, the data stream comprising:
    image data for at least one of the plurality of images of the scene;
    scene data, wherein the scene data represents the three dimensional spatial data;
    coefficient data, wherein the coefficient data describes coefficients of the view synthesis neural network circuit after training.

2. The apparatus of claim 1,
wherein the first receiver circuit is arranged to receive a plurality of input video sequences,
wherein the plurality of input video sequences represent views of the scene from the different view poses,
wherein the plurality of images of the scene are frames of the plurality of input video sequences,
wherein the neural network trainer circuit is arranged to dynamically train the view synthesis neural network circuit so as to generate coefficients of the view synthesis neural network circuit,
wherein the generator circuit is arranged to generate the data stream so as to comprise a portion of frames of the plurality of input video sequences,
wherein the generator circuit is arranged to generate time varying coefficient data,
wherein the time varying coefficient data describe time varying coefficients of the view synthesis neural network circuit after training.

3. The apparatus of claim 1,
wherein the neural network trainer circuit is arranged to train the view synthesis neural network circuit using a plurality of training images,
wherein the plurality of training images comprise a first plurality of reference images,
wherein the first plurality of reference images comprise view poses not represented by images of the at least one of the plurality of images of the scene.

4. The apparatus of claim 3, wherein the first plurality of reference images comprises at least one image selected from the group consisting of a reference image generated by a non-neural network view shifting using the plurality of images of the scene and a reference image generated from a visual scene model of the scene.

5. The apparatus of claim 3,
wherein the plurality of training images comprises a second plurality of reference images,
wherein the second plurality of reference images comprise images of the plurality of images of the scene,
wherein the neural network trainer circuit is arranged to apply different weightings to the first plurality of reference images and the second plurality of reference images.

6. The apparatus of claim 1, wherein the neural network trainer circuit is arranged to encode and decode at least one of the plurality of images of the scene before the plurality of images of the scene are provided to the view synthesis neural network circuit.

7. The apparatus of claim 1, wherein the neural network trainer circuit is arranged to encode and decode the three dimensional spatial data before the three dimensional spatial data is provided to the view synthesis neural network circuit.

8. The apparatus of claim 1,
wherein the neural network trainer circuit is arranged to initialize the view synthesis neural network circuit with a plurality of default coefficients,
wherein the neural network trainer circuit is arranged to train the view synthesis neural network circuit so as to determine modified coefficients for the view synthesis neural network circuit,
wherein the generator circuit is arranged to comprise at least one modified coefficients in the audio visual data stream.

9. The apparatus of claim 8, wherein the generator circuit is arranged to select a subset of coefficients for transmission in response to a difference between the modified coefficients and the default coefficients.

10. An apparatus comprising:
a receiver circuit, wherein the receiver circuit is arranged to receive a data stream, wherein the date stream comprises:
    image data for a plurality of images of the scene, wherein the plurality of images of the scene represent a scene captured from different view poses;
    three dimensional spatial data for the scene; and
    coefficient data describing coefficients for a view synthesis neural network circuit;
    wherein the view synthesis neural network circuit, wherein the view syntheses neural network circuit is arranged to generate view shifted images of the scene for different view poses from the plurality of images of the scene and the three dimensional spatial data; and
a neural network controller circuit, wherein the view syntheses neural network circuit is arranged to set coefficients of the neural network in response to the coefficient data.

11. The apparatus of claim 10, wherein the data stream comprises a plurality of video sequences, wherein the data stream comprises a plurality of frames, wherein the plurality of frames represents views of the scene from the different view poses, wherein the plurality of images of the scene are frames of the plurality of frames, wherein the coefficient data comprises time varying coefficient data, wherein the time varying coefficient data describes time varying coefficients of the view synthesis neural network circuit, wherein the neural network controller circuit is arranged to change the coefficients of the view synthesis neural network circuit in response to the time varying coefficient data.

12. The apparatus of claim 11, wherein the neural network controller circuit is arranged to determine interpolated coefficient values for at least one time instant for which coefficient data is not included in the data stream, wherein the interpolated coefficient values are determined from coefficient values of the time varying coefficient data, wherein the neural network controller circuit is arranged to set the coefficients of the view synthesis neural network circuit to the interpolated coefficient values for the at least one time instant.

13. The apparatus of claim 10, wherein the data stream comprises at least one neural network feature map for an image of a view pose that is different from the view poses of the plurality of images of the scene, wherein the neural network controller circuit is arranged to configure the view synthesis neural network circuit with the at least one feature map.

14. The apparatus of claim 10, wherein the neural network controller circuit is arranged to initialize the view synthesis neural network circuit with a plurality of default coefficients, wherein the neural network controller circuit is arranged to overwrite the default coefficients by coefficients from the audio visual data stream.

15. The apparatus of claim 14, wherein the neural network controller circuit is arranged to select the plurality of default coefficients from a plurality of sets of default coefficients in response to the plurality of images of the scene.

16. The apparatus of claim 10, wherein the at least two of the image data, scene data, and the coefficient data share a Group Of Pictures, in the data stream.

17. The apparatus of claim 10, wherein the view synthesis neural network circuit comprises a number of tuneable layers and a number of non-tuneable layers, wherein the data stream comprises coefficient data for tuneable layers.

18. The apparatus of claim 10, wherein the three dimensional spatial data comprises video point cloud data for the scene.

19. A method for generating audio visual data stream, the method comprising:

receiving a plurality of images of a scene, wherein the scene is captured from different view poses;

receiving three dimensional spatial data of the scene;

generating view shifted images for the scene for different view poses from the plurality of images of the scene and the three dimensional spatial data, wherein the generating uses a view syntheses neural network;

training the view synthesis neural network based on images of the scene for different view poses; and generating a data stream, wherein the data stream comprises:

image data for at least one of the plurality of images of the scene;

scene data, wherein the scene data represents the three dimensional spatial data; and coefficient data, wherein the coefficient data describes coefficients of the view synthesis neural network circuit after training.

20. A method comprising:

receiving a data stream, wherein the date stream comprises:

image data for a plurality of images of the scene, wherein the plurality of images of the scene represent a scene captured from different view poses;

three dimensional spatial data for the scene; and coefficient data describing coefficients for a view synthesis neural network circuit;

generating view shifted images of the scene for different view poses from the plurality of images of the scene and the three dimensional spatial data, using a view synthesis neural network; and setting coefficients of the view synthesis neural network in response to the coefficient data.

21. A computer program stored on a non-transitory medium, wherein the computer program when executed on a processor performs the method as claimed in claim 19.

22. A computer program stored on a non-transitory medium, wherein the computer program when executed on a processor performs the method as claimed in claim 20.

23. An apparatus comprising:

a processor circuit and a memory circuit, wherein the memory is arranged to store instructions for the processor circuit, wherein the processor circuit is arranged to receive a plurality of images of a scene, wherein the scene is captured from different view poses, wherein the processor circuit is arranged to receive three dimensional spatial data of the scene, wherein the processor circuit is arranged to generate view shifted images for the scene for different view poses from the plurality of images of the scene and the three dimensional spatial data using a view syntheses neural network, wherein the processor circuit is arranged to train the view synthesis neural network based on images of the scene for different view poses, wherein the processor circuit is arranged to generate a data stream, wherein the data stream comprises:

image data for at least one of the plurality of images of the scene;

scene data, wherein the scene data represents the three dimensional spatial data;] and coefficient data, wherein the coefficient data describes coefficients of the view synthesis neural network circuit after training.

24. An apparatus comprising:

a processor circuit and a memory circuit, wherein the memory is arranged to store instructions for the processor circuit, wherein the processor circuit is arranged to receive a data stream, wherein the date stream comprises:

image data for a plurality of images of the scene, wherein the plurality of images of the scene represent a scene captured from different view poses;

three dimensional spatial data for the scene; and coefficient data describing coefficients for a view synthesis neural network circuit;

wherein the processor circuit is arranged to generate view shifted images of the scene for different view poses from the plurality of images of the scene and the three dimensional spatial data using a view synthesis neural network, wherein the processor circuit is arranged to set coefficients of the view synthesis neural network in response to the coefficient data.

* * * * *